Oct. 16, 1934.  J. NAMET  1,977,347

ELECTRIC CORD TAKE-UP DEVICE

Filed April 25, 1934

INVENTOR
JULIUS NAMET
BY
Burkett, Hyde, Higley + Meyer
ATTORNEYS

Patented Oct. 16, 1934

1,977,347

UNITED STATES PATENT OFFICE 1,977,347

ELECTRIC CORD TAKE-UP DEVICE

Julius Namet, Freedom, Ohio, assignor of one-third to Albert B. Gardella, Cleveland, Ohio, and one-third to George C. Guckes, Lakewood, Ohio Application April 25, 1934, Serial No. 722,393

10 Claims. (Cl. 173—367)

This invention relates to improvements in electric cord take-up devices, such as are used for releasably holding any excess lengths of the current-conducting cords of lamps, radios, and other electrical devices or appliances.

More particularly, the present invention relates to an electric cord take-up device which is adapted to be releasably and electrically connected to a service outlet or the like and to have releasably and electrically connected thereto the plug end of the current-conducting cord of an electrical device or appliance, any excess length of said cord being releasably held by said take-up device.

The general object of the present invention is the provision of an improved electric cord take-up device which comprises a minimum number of inexpensively constructed and readily assembled parts, and which device is of neat appearance, of compact size and of strong and sturdy character.

A further object of the present invention is the provision of an improved electric cord take-up device which includes a stationary socket and spool member to which the plug end of the current-conducting cord of an electrical device or appliance may be releasably and electrically connected and on which any excess length of said cord may be readily wound, the winding of said cord on said member being easily and conveniently effected by the manual rotation of an enclosing casing with which the take-up device is provided.

A further object of the present invention is the provision of an improved electric cord take-up device which is capable of use as a simple built-in part of an electrical device or appliance for releasably holding any excess length of the current-conducting cord thereof.

Further objects of the invention are in part obvious and in part will appear more in detail hereinafter.

Figure 2:
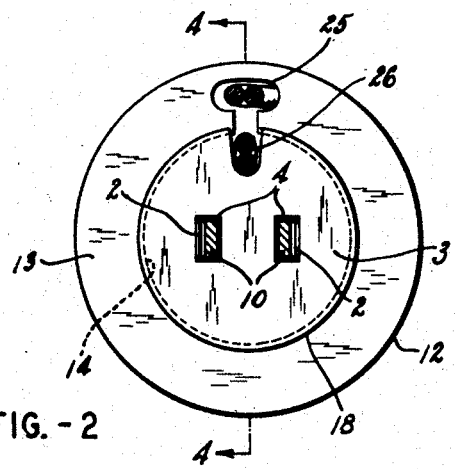
Figure 1:
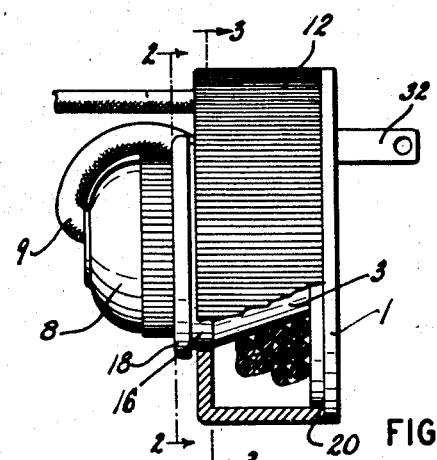
Figure 3:
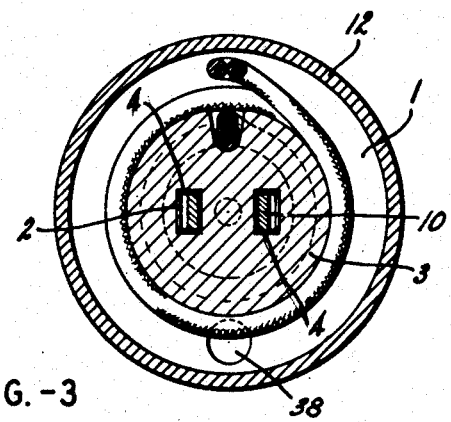
Figure 4:
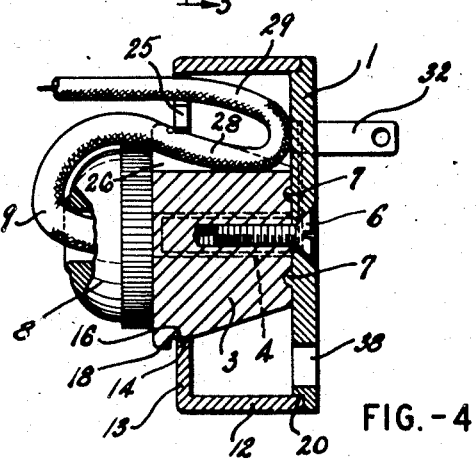
Figure 7:
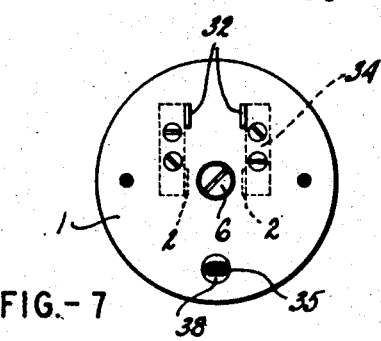
Figure 5:
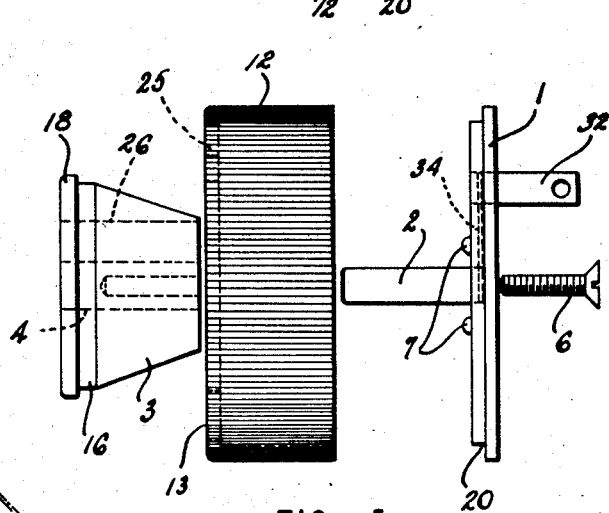
Figure 6:
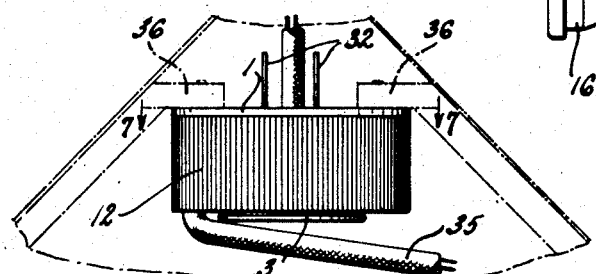

The invention will be readily understood from the following description thereof, reference being had to the accompanying drawing in which Fig. 1 is a side view of the present improved electric cord take-up device, the plug end of an electric cord being connected thereto and a part of said cord being wound on the stationary socket and spool member thereof, a part of the casing of said device being broken away and in section to show said wound cord; Fig. 2 is an end view of said device, the view being on the line 2—2, Fig. 1; Fig. 3 is a cross-sectional view of the device on the line 3—3, Fig. 1; Fig. 4 is a longitudinal sectional view of said device, the view being on the line 4—4, Fig. 2; Fig. 5 is a side view of the several parts of the device in spaced or "exploded" relation; Fig. 6 is a side view of the device as mounted in the base of a lamp or other electrical device or appliance; and Fig. 7 is a plan view of the outer face of the base plate of the device, the view being on the line 7—7, Fig. 6.

In the embodiment of the invention here illustrated, the device includes a base plate 1 of any suitable size, shape and material, the one here shown being of circular shape and being made of insulating material, such as hard rubber or the like. Suitably secured to the inner face of said base plate, at substantially the center thereof, is a pair of forwardly extending contact blades or prongs 2, on which is mounted a suitable socket and spool member 3, said member being provided with a pair of longitudinally and centrally disposed through slots 4 for receiving said blades. As here shown, said socket and spool member is of tapered form, the smaller end face thereof engaging the inner face of said base plate and being firmly secured thereto by a screw 6 or the like. If desired, the inner face of said base plate may be provided with one or more projections 7, two being here shown, engaging in suitable cavities in the socket and reel member 3 for assisting in preventing non-rotation of said member, etc., as will be readily understood.

To the outer end face of this socket and spool member 3, outside of the casing hereinafter described, is adapted to be releasably connected the ordinary contact plug 8 of the current-conducting cord 9 of a lamp, radio or other electrical device or appliance, the outer end portions of the slots 4 of said member being adapted to receive the usual contact blades 10 of said plug. In said slots 4, the contact blades 10 of said plug 8 are adapted to overlap and yieldingly engage the contact blades 2 of the base plate 1, and thus effect an electrical connection therebetween, as will later more fully appear.

On the tapered side wall of said socket and spool member 3 is adapted to be wound any excess length of said cord, with consequent avoidance of the necessity of having such excess length of cord lying loosely upon the floor or the like where it is not only dangerous but unsightly in appearance.

For winding such excess length of cord on said socket and spool member, manually rotatable winding means is provided in the form of an enclosing casing having a cylindrical side wall 12, the outer surface of which is preferably knurled to facilitate turning thereof, and a generally circular front wall 13, the latter being provided with a centrally disposed opening 14 to receive the outer end portion of the socket and reel member 3. As clearly shown, said socket and spool member is provided at its outer end with a short cylindrical portion 16 about which the casing front wall 13 extends, and with a laterally extending, annular end flange 18 between which and the base plate 1 the rotatable casing is confined. To center the inner end of the casing side wall 12, the marginal portion of the base plate 1 is here provided with an annular groove 20 which constitutes a centering seat for the rear end of said casing side wall.

In order to afford access to the tapered side wall of the socket and spool member 3, upon which wall any excess length of the cord 9 is to be wound, the front wall 13 of said rotatable casing is provided with a suitable opening or aperture 25, with which cooperates a longitudinally disposed, full length groove 26 in said socket and reel member.

To wind an excess portion of an electric cord on such socket and spool member, after the contact plug of said cord has been connected thereto, a part of said cord adjacent said plug is looped into U-form, as shown in Fig. 4, and thereafter inserted into the rotatable casing of the device, the inner part 28 of said loop being positioned in the groove 26 of the socket and spool member 3 and the outer part 29 of said loop being positioned in the aperture 25 of the casing front wall 13, said casing first having been turned to bring its aperture into alignment with said groove so as to jointly form in effect, a single loop-receiving opening. The casing is thereafter manually rotated in either a clockwise or a counter-clockwise direction, the outer cord part 29 and thereafter the remaining parts of the excess length of said cord being wound about the tapered side wall of said socket and spool member in the manner shown in Fig. 1. Any desired length of cord can be wound upon said member, where it is neatly concealed by the enclosing casing of the device.

To enable the present take-up device to be electrically connected to a service outlet, such as a wall service outlet or the like, the base plate 1 of the device is also provided with a pair of rearwardly extending contact blades 32 for effecting the usual electrical connection therewith, such rearwardly extending contact blades being electrically connected to the forwardly extending contact blades 2 of said base plate by any suitable means and in any suitable manner. As here shown, each such pair of contact blades is provided with laterally bent inner end portions, and suitable metal strips 34, screwed or otherwise suitably secured to the base plate 1, as shown in Fig. 7, engage and electrically connect the laterally bent inner end portions of one pair of contact blades with the laterally bent inner end portions of the other pair of blades.

Preferably and as shown, the rearwardly extending contact blades 32 of the present device are arranged off-center, the purpose of which is to enable two take-up devices of the type here illustrated to be connected to a double service outlet, the spacing of the two pairs of contacts of which is usually rather limited.

Figs. 6 and 7 show the manner in which the present take-up device may be mounted in the base of a lamp or the like for holding any excess length of the current-conducting cord 35 thereof. As shown, the device is generally horizontally disposed, with its base plate 1 uppermost, said base plate being screwed or otherwise secured to a pair of lugs 36 with which said lamp base is provided. An aperture 38 adjacent the margin of the base plate 1 constitutes the lead-in opening for the cord 35, and by merely rotating the casing of the device, as hereinbefore mentioned, any excess length of cord may be wound on the stationary socket and spool member thereof, all as will be readily understood.

Further features and advantages of the present invention will be apparent to those skilled in the art to which it relates.

What I claim is:

1. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and also being provided on an end face thereof with socket means to enable the contact plug of said electric cord to be connected thereto in electrical connection with said contact means, said spool structure also being provided with anchoring means to enable the initial portion of such excess length of cord to be anchored thereto preparatory to the winding on said spool structure of the remaining portion of such excess length of cord.

2. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and also being provided on an end face thereof with socket means to enable the contact plug of said electric cord to be connected thereto in electrical connection with said contact means, said spool structure also being provided with anchoring means to enable the initial portion of such excess length of cord to be anchored thereto preparatory to the winding thereon of the remaining portion of such excess length of cord, and means manually rotatable about said spool structure for winding thereon the remaining portion of such excess length of cord.

3. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and also being provided with socket means to enable the contact plug of said electric cord to be connected thereto in electrical connection with said contact means, and a casing surrounding said spool structure, the socket means of said spool structure being outside of said casing and said casing being provided with an opening to permit said excess length of cord to be wound on said spool structure.

4. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and also being provided on an end face thereof with socket means to enable the contact plug of said electric cord to be connected thereto in electrical connection with said contact means, and a casing surrounding said spool structure, said end face of said spool structure being outside of said casing and said casing being provided with an opening to permit said excess length of cord to be wound on said spool structure.

5. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and with socket means to enable the contact plug of said electric cord to be connected thereto in electrical connection with the contact means thereof, and manually rotatable means for winding on said spool structure such excess length of cord, said spool structure and said rotatable means being provided with cooperating passageways to receive a loop of said cord adjacent its contact plug, the passageway of said spool structure serving as an anchoring means for the inner portion of said loop, whereby subsequent rotation of said rotatable means effects a winding on said spool structure of the remaining portion of such excess length of cord.

6. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and with socket means to enable the contact plug of said electric cord to be connected thereto in electrical connection with the contact means thereof, and manually rotatable casing means surrounding said spool structure for winding thereon such excess length of cord, said casing means having a side wall and a front wall, said spool structure and the front wall of said casing means being provided with cooperating passageways to receive a loop of said cord adjacent its contact plug, the passageway of said spool structure serving as an anchoring means for the inner portion of said loop, whereby rotation of said casing means effects a winding on said spool structure of the remaining portion of such excess length of cord.

7. A device for taking up the excess length of an electric cord provided with a contact plug, said device comprising a spool structure adapted to have wound thereon as much of said cord, adjacent its contact plug, as constitutes the excess length thereof, said structure being provided with projecting contact means to enable it to be electrically connected to a service outlet socket and with socket means to enable the contact plug of said electric cord to be connected thereto in electrical connection with the contact means thereof, and manually rotatable casing means surrounding said spool structure for winding thereon such excess length of cord, said casing means having a side wall and a front wall, said spool structure and the front wall of said casing means being provided with cooperating passageways which jointly form, when they are in alignment, an opening to receive a loop of said cord adjacent its contact plug, the passageway of said spool structure serving as an anchoring means for the inner portion of said loop, whereby rotation of said casing means effects a winding on said spool structure of the remaining portion of such excess length of cord.

8. A device for taking up the excess length of an electric cord provided with a pronged contact plug, said device comprising a base provided with a pair of rearwardly extending contact prongs for electrical connection to a service outlet socket and with a pair of forwardly extending contact prongs electrically connected to said rearwardly extending contact prongs, a spool member secured to said base and provided with a through passage means into the rear end portion of which project said forwardly extending base contact prongs, the front end portion of said spool member passage means being adapted to receive, in electrical connection with the forwardly extending base contact prongs therein, the contact prongs of the contact plug of said electric cord, said spool member being adapted to have wound thereon as much of said electric cord, adjacent its contact plug, as constitutes the excess length thereof, and wall means surrounding said spool member for confining thereon the excess length of cord wound thereon.

9. A device for taking up the excess length of an electric cord provided with a pronged contact plug, said device comprising a base provided with a pair of rearwardly extending contact prongs for electrical connection to a service outlet socket and with a pair of forwardly extending contact prongs electrically connected to said rearwardly extending contact prongs, a spool member secured to said base and provided with through passage means into the rear end portion of which project said forwardly extending base contact prongs, the front end portion of said spool member passage means being adapted to receive, in electrical connection with the forwardly extending base contact prongs therein, the contact prongs of the contact plug of said electric cord, said spool member being adapted to have wound thereon as much of said electric cord, adjacent its contact plug, as constitutes the excess length thereof, said spool member being provided with anchoring means to enable the initial portion of such excess length of cord to be anchored to said spool member preparatory to the winding thereon of the remaining portion of said excess length of cord, and manually rotatable cord-confining means surrounding said spool member for winding thereon said remaining portion of such excess length of cord.

10. A device for taking up the excess length of an electric cord provided with a pronged contact plug, said device comprising a base provided with a pair of rearwardly extending contact prongs for electrical connection to a service outlet socket and with a pair of forwardly extending contact prongs electrically connected to said rearwardly extending contact prongs, a spool member secured to said base and provided with through passage means into the rear end portion of which project said forwardly extending base contact prongs, the front end portion of said spool member passage means being adapted to receive, in electrical connection with the forwardly extending base contact prongs therein, the contact prongs of the contact plug of said electric cord, said spool member being adapted to have wound thereon as much of said electric cord, adjacent its contact plug, as constitutes the excess length thereof, said spool member being provided with anchoring means to enable the initial portion of such excess length of cord to be anchored to said spool member preparatory to the winding thereon of the remaining portion of said excess length of cord, and manually rotatable means surrounding said spool member for winding thereon said remaining portion of such excess length of cord, the rear end of said rotatable means being journalled on said base and the front end of said rotatable means being journalled on the front end portion of said spool member, said spool member being provided at its front end with shoulder means for maintaining said rotatable means in assembly with said base and said spool member.

JULIUS NAMET.